E. R. LYMAN.
GAME.
APPLICATION FILED OCT. 12, 1918.
1,317,880.
Patented Oct. 7, 1919.
2 SHEETS—SHEET 2.
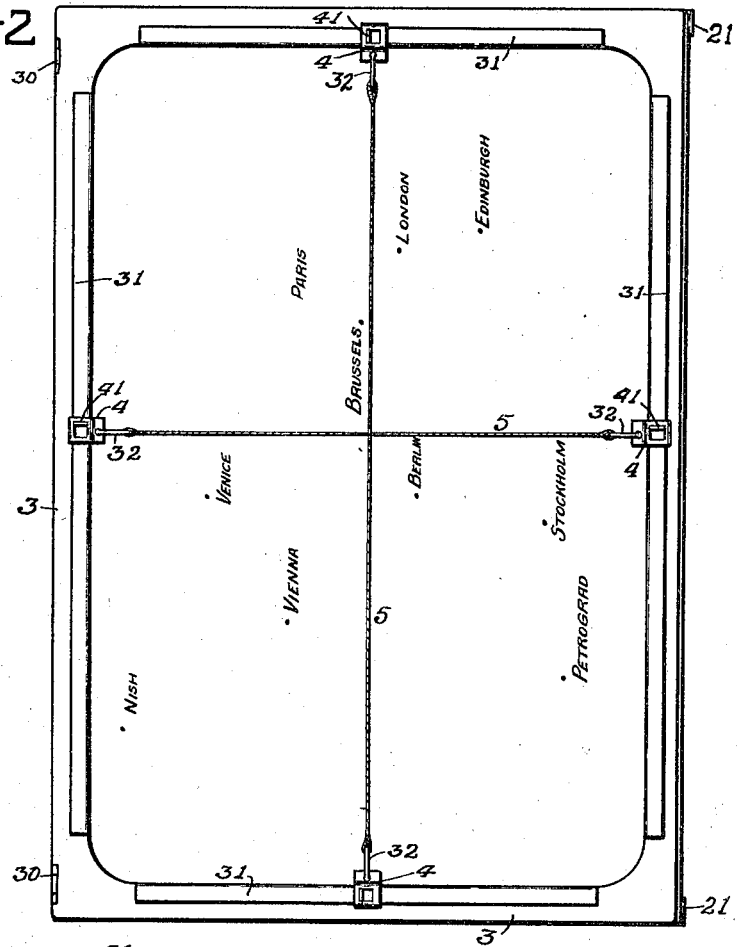
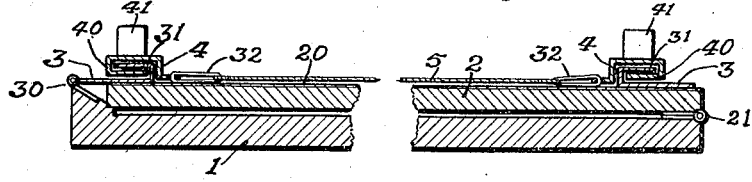
INVENTOR
Edmund R. Lyman.
BY
Henry L. Reynolds
ATTORNEY

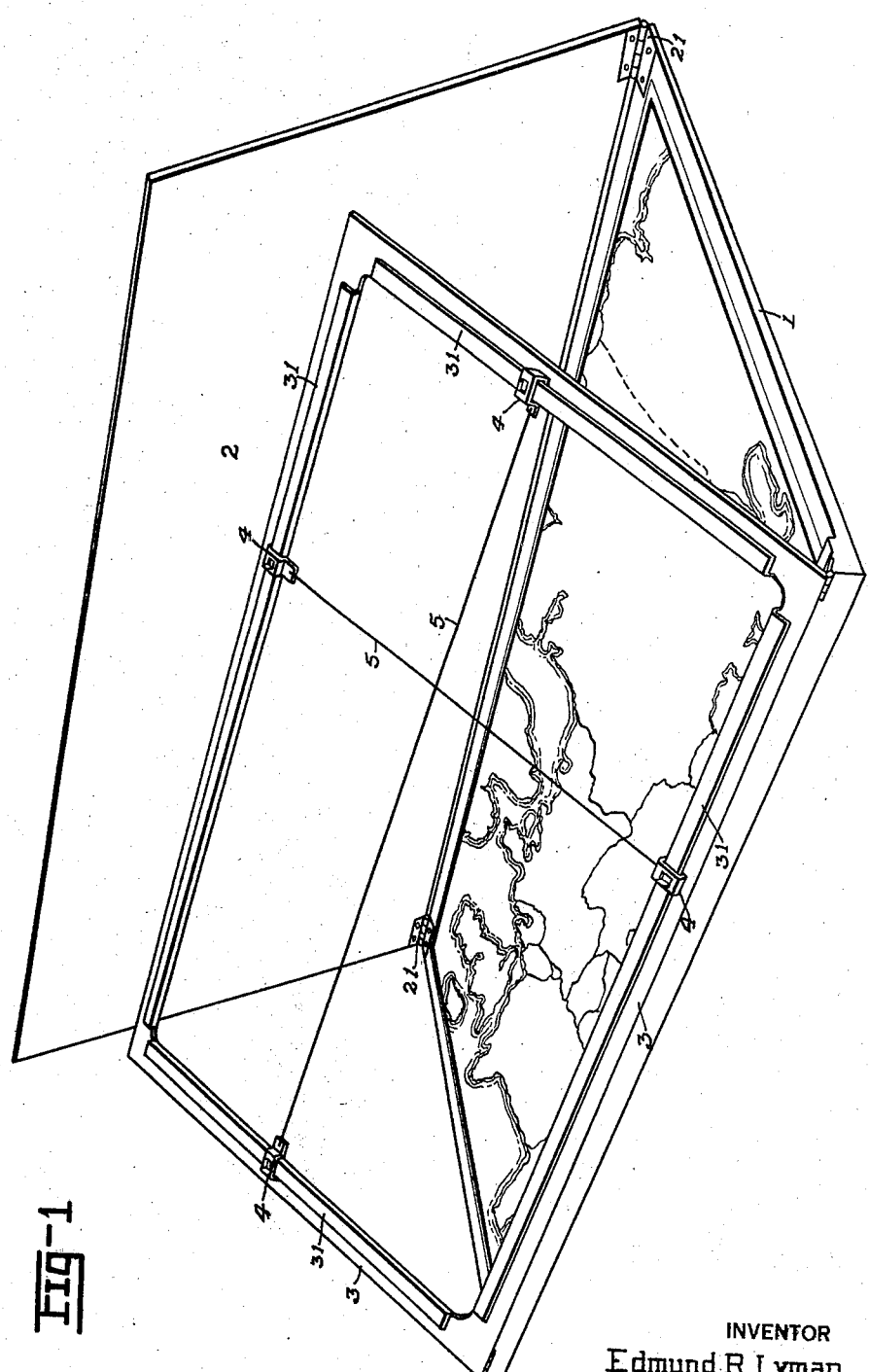

UNITED STATES PATENT OFFICE.

EDMUND R. LYMAN, OF SEATTLE, WASHINGTON.

GAME.

1,317,880. Specification of Letters Patent. Patented Oct. 7, 1919.

Application filed October 12, 1918. Serial No. 257,848.

*To all whom it may concern:*

Be it known that I, EDMUND R. LYMAN, a citizen of the United States, and resident of the city of Seattle, county of King, and State of Washington, have invented certain new and useful Improvements in Games, of which the following is a specification.

My invention relates to games and consists of an apparatus which is intended both for instruction and for use in playing games, the same being based upon the ability to locate the relative positions of points upon the map.

The object of my invention is to provide an apparatus which may be employed with which to play a game and to make this of such character that it becomes an efficient educational means adapted to increase the accuracy of the knowledge of geography.

The device as illustrated shows the apparatus employed in playing this game in a form of construction which I prefer to use. The features of this, which I deem to be novel and upon which I wish patent protection, will be herein set forth and then particularly described in the claims.

Figure 1 shows the apparatus in perspective with parts thereof raised.

Fig. 2 is a plan view showing the apparatus closed.

Fig. 3 is a transverse section through the apparatus in closed position.

The apparatus employed in playing this game comprises three essential elements. First, a base or means for holding a map, or whatever chart or other object is used as a substitute for a map. Second, a means for holding a paper or surface upon which points may be located. Third, a means for accurately locating any point upon the map and transferring the position of this to the paper. The apparatus shown in the accompanying drawings is a simple and desirable form of construction, in which these essential elements have been embodied, the same being that which I prefer to use.

The part 1 is the base, this being in the form of a board or sheet of whatever size it is desired to use. To this is secured a part 2 which is also preferably in the form of a board or sheet and is designed for holding upon its upper or outer surface, referring to the surface which is outermost when the two parts are together, a paper or other surface upon which the location of points may be marked. This paper, as I refer to it, may be a sheet of paper which is removably attached to the board 2, or it may be a surface which is integral with the board and adapted for marking points thereon.

I have indicated a sheet of paper 20 as secured to the upper surface of the board 2. This sheet, instead of being of paper, might be of thin celluloid or other material and it also might be a coating of paint or other preparation which is adapted for the reception of pencil marks, which can be conveniently erased when desired. The material of which this surface is composed and whether the same is separable or not is immaterial. If it is a removable sheet, means should be provided by which it may be detachably secured. The term paper as herein applied to this part of the apparatus is to be understood as covering such a surface as well as an actual sheet of paper.

The base 1 and the board 2 should be provided with means whereby they may be accurately positioned together and so that they may be separated in such a way as to expose the map carried by the base 1. A convenient and effective way of doing this is by the use of hinges 21. The board 2 may thus be raised so as to expose the map carried by the base to view or dropped so as to cover this map.

Along with the parts described I provide means by which the position of any point upon the map may be accurately determined upon the map and then transferred to the paper 20. The means illustrated consists in providing a frame 3 which is hinged at 30 to the side of the base 1 opposite that to which the board 2 is hinged. This is an open or skeleton frame, that is, it consists simply of four bars leaving a large space in the center open. Along with this frame I provide four adjustable members, the same consisting of slides 4 which may be adjusted, each along its particular side, so as to occupy any desired position thereon.

A convenient manner of mounting and supporting these is illustrated in the sectional view of Fig. 3. Each bar 3 is shown as having a flange 31 turned upwardly and outwardly from its inner edge so as to form a guide for the reception of the slides 4. The slides 4 have a flange 40, which is turned under and inwardly so as to match with and fit over the flange 31 and slide thereon. Stretched between the two slides 4 which are at opposite sides of the frame is a cord 5.

This cord I prefer to either make of a material having a certain amount of elasticity or to provide it with an elastic element, as a rubber band, 32, so that there may be a little give in the length of the cord. For convenience in moving the slide 4 I have shown it as provided with an upwardly extending ear or lug 41, by which it may be engaged for sliding it along the guide 31.

The above apparatus is equipped in the following manner. A map or chart, or a series of maps or charts, are provided with the apparatus. One or more of these is secured on the upper surface of the base 1. The board 2 is turned down so as to cover this map. It is, of course, supposed that the map shall have been inspected and studied by any one using the game.

The object is to locate upon the upper surface of the board 2, or upon the paper 20 carried thereby, the position of any point of the map, this being done from memory and while the map is covered, and to then determine how near this located point may be to the actual location of the point. The board 2 is raised and the frame 3 is turned down upon the map. The slides 4 are then moved so that the cords 5 each pass over the point on the map. The intersection of these lines then accurately locates the point. Frame 3 is then turned up and the frame 2 turned down and the frame 3 brought down on top of the frame 2. The intersection of these lines then shows the correct location of the point upon the paper 20 and in this way it may be determined how accurate has been the estimate of this point made while the map was covered. The location of a series of these points may be made and the accuracy of each checked in this way.

In using this apparatus to play a game, a definite number of points, as a series of cities, may be chosen. The map may be inspected so that the players will have a mental picture of the map. Each player then in turn will locate from memory and by estimation, the towns which have been chosen. The correct location will then be made by the use of the frame 3 and the distance which the estimated locations departed from the actual locations, will be measured to determine the player's score. This procedure is followed for each of the players. Each player may be provided with a clean sheet at the beginning of his play.

The rules of play may be based somewhat upon the game of golf. Each town which is located may be considered as one hole. The player who estimates the position of this point most nearly, is the one who wins that hole, and the winning of the game would then be by the player who wins the largest number of holes.

The rules of play may of course be widely varied. The winning of the game may go to the player whose sum total of the distances by which the points have been located is least. In fact, the particular rules to be employed is not the subject of my present invention but the apparatus by which the game would be played. It is of course evident that this device may be of considerable educational value entirely apart from any use to which it may be put as a game. It is also evident that use of this apparatus would contribute very largely to geographical knowledge of the players and to the accuracy of this knowledge. The maps employed may be any map which is not too large to fit upon the apparatus.

What I claim as my invention is:

1. A game apparatus comprising a map holding member, means for accurately locating any point on the map, and a paper holding frame provided with means for registration with the map and adapted to cover or expose the map at will.

2. A game apparatus comprising a base adapted to hold a map, a paper holding frame hinged to one side of said base, and a frame hinged to another side of the base and carrying movable coördinates.

3. A game apparatus comprising a base adapted to hold a map, a paper holding frame hinged to one side of said base, an open frame hinged to another side of the base, and coördinate members movably mounted on said open frame.

4. A game apparatus comprising a base adapted to hold a map, a paper holding frame hinged to one side of said base, an open or skeleton frame hinged to another side of the base, slides adjustably supported about the margins of said open frame and cords connecting slides at opposite sides of the frame and constituting coördinating means.

5. An educational and game apparatus comprising a map holding base, a frame adapted to hold a map-covering sheet, and means for accurately transferring the location of a point between the map and said cover sheet.

Signed at Seattle, Washington, this 28th day of September, 1918.

EDMUND R. LYMAN.

Copies of this patent may be obtained for five cents each, by addressing the "Commissioner of Patents, Washington, D. C."